United States Patent [19]

Morlok et al.

[11] 4,284,291
[45] Aug. 18, 1981

[54] VEHICLE, PARTICULARLY MOTOR DRIVEN UTILITY VEHICLE

[75] Inventors: Albrecht Morlok, Nordstetten; Fritz Hacker, Ludwigsburg-Ossweil; Peter Kölling, Friolzheim, all of Fed. Rep. of Germany

[73] Assignee: Dr. Ing. h.c.F. Porsche Aktiengesellschaft, Stuttgart, Fed. Rep. of Germany

[21] Appl. No.: 82,218

[22] Filed: Oct. 4, 1979

[30] Foreign Application Priority Data

Oct. 4, 1978 [DE] Fed. Rep. of Germany ....... 2843225

[51] Int. Cl.³ .......................... B60D 1/00; B62D 53/02
[52] U.S. Cl. .................................... 280/479 R; 180/11; 180/14 R; 280/785
[58] Field of Search ............... 180/11, 14 R; 280/477, 280/478 R, 478 A, 478 B, 479 R, 479 A, 488, 767, 769, 785; 296/35.3, 196

[56] References Cited

U.S. PATENT DOCUMENTS

| | | | |
|---|---|---|---|
| 1,797,660 | 3/1931 | Hughes | 280/488 |
| 3,478,833 | 11/1969 | Breon et al. | 180/14 R |
| 3,521,908 | 7/1970 | Carter | 280/479 R |
| 3,767,230 | 10/1973 | DeVries | 280/477 |
| 3,774,943 | 11/1973 | Schmiesing | 280/479 R |
| 3,822,756 | 7/1974 | Martin | 180/14 R |
| 3,854,542 | 12/1974 | Jesswein et al. | 280/479 R |
| 4,030,776 | 6/1977 | Bricknell et al. | 280/477 |

Primary Examiner—Joseph F. Peters, Jr.
Assistant Examiner—Donn McGiehan
Attorney, Agent, or Firm—Craig and Antonelli

[57] ABSTRACT

A vehicle of the type having a motor driven vehicle unit and a wheeled auxiliary hook-up unit coupled thereto. A towing coupling is provided for enabling the auxiliary unit to be coupled to the vehicle unit in an articulated manner. A centering device is provided for centering the vehicle unit relative to the auxiliary hookup unit and a tightening fixture is provided to act on the towing coupling so as to displace the auxiliary towing unit relative to the vehicle unit so that it can be fixedly secured by a locking device.

14 Claims, 7 Drawing Figures

VEHICLE, PARTICULARLY MOTOR DRIVEN UTILITY VEHICLE

BACKGROUND AND SUMMARY OF THE INVENTION

The invention relates to a vehicle, in particular a motor-driven utility vehicle, with a hook-up unit comprising at least one axle and supporting legs, wherein the vehicle and the hook-up unit are coupled by way of a centering means including wedge-shape members and by way of a locking mechanism.

In a conventional vehicle of the type mentioned hereinabove (DOS [German Unexamined Laid-Open Application] No. 1,580,019), the hook-up unit comprises a connecting wedge which is inserted in a correspondingly constructed pocket of the vehicle and fastened therein by means of a holding device. This arrangement is burdened by the disadvantage that it is difficult to attach the hook-up unit in case of angular and directional differences between the two vehicle components and/or in case of differences in terrain. Thereby, a rapid and secure coupling of the unit to the vehicle, done preferably in cases of rendering technical assistance, fire fighting, or the like, is impaired. Additionally, the coupling process requires at least two people, i.e., the driver of the vehicle and a person giving directions, and this causes further complications.

As a result, it is an object of the invention to provide a vehicle with a hook-up unit which can be rapidly and safely coupled to and/or uncoupled from the vehicle, and, in particular, to enable the coupling process to be made possible without reliance upon another's assistance and directions.

According to an embodiment of the invention, this object has been attained by providing, between the vehicle and the hook-up unit, a towing arrangement which is surrounded by centering members and which cooperates with a tightening fixture that is movable in the longitudinal direction of the vehicle. In this connection, it is advantageous to give each centering member the shape of a truncated pyramid. Furthermore, the towing arrangement is articulated to the hook-up unit and is connected to a coupling of the tightening fixture. The towing arrangement is maintained in a middle position by means of spring elements. The tightening fixture arranged at the vehicle comprises a guide element for the coupling, and the guide element is fashioned as a pipe receiving a sliding element of the coupling. The sliding element has the shape of a crosshead. The vehicle and hook-up are securable together by a locking mechanism. This locking mechanism comprises connecting hooks cooperating with mounting members. The connecting hooks are movable about vertically extending pins or studs arranged outside of the longitudinal plane of symmetry of the vehicle. The connecting hooks are attached to the vehicle, and the mounting members are attached to the hook-up unit. The connecting hooks, the tightening fixture, and the coupling are actuated by means of hydraulic cylinders.

Among the advantages attainable, in particular, by the invention are that, due to the towing arrangement and the tightening fixture, the hook-up can be rapidly and simply joined to the vehicle. In this connection, the vehicle and the hook-up unit can be disposed at an angle or in an offset relationship, caused by driving differences or unevennesses of the terrain. The tightening fixture pulls the hook-up unit in the direction toward the vehicle, thus aligning the hook-up unit by means of the fixation device in a correct position with respect to the vehicle. The tightening hooks constituting the locking mechanism ensure a secure connection of the two vehicle components. If the vehicle and the hook-up unit are located in an especially uneven terrain, then there is the possibility of pulling the hook-up unit with the vehicle by way of the towing means in the manner of a single-axle trailer to a more favorable terrain and only thereafter conducting the coupling step. Since the connection of the towing means with the coupling of the tightening fixture takes place automatically, the coupling step can be executed by the driver of the vehicle without help from anyone.

These and further objects, features and advantages of the present invention will become more obvious from the following description when taken in connection with the accompanying drawings which show, for purposes of illustration only, a single embodiment in accordance with the present invention.

DETAILED DESCRIPTION OF THE PREFERRED EMBODIMENT

Figure 1:
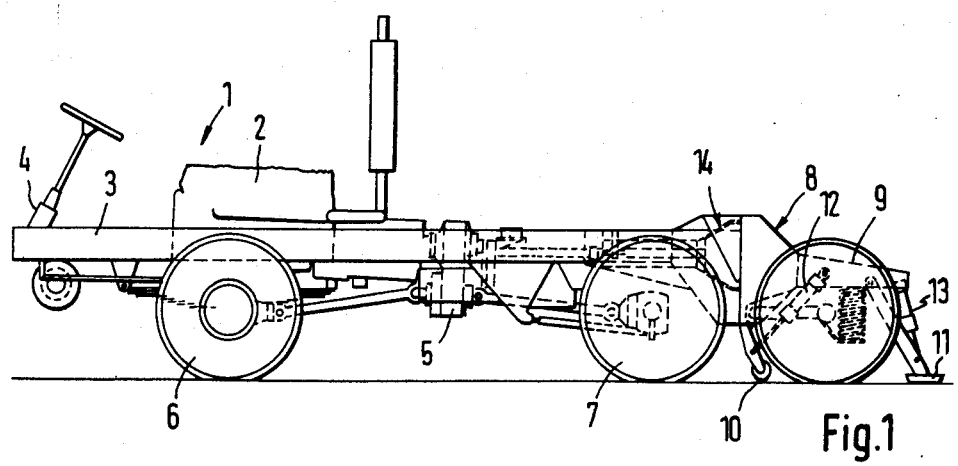
FIG. 1 is a lateral view of the vehicle according to the invention with the hook-up unit.

The vehicle 1 comprises an engine 2, a chassis 3, and a steering mechanism 4. The front axle 6 and the rear axle 7 are driven by way of a transfer case 5. A hook-up unit 8 is connected to the vehicle 1, this unit serving for transporting implements, for example, for fire fighting. This unit comprises an axle 9 and supports 10, 11 which can be extended and retracted, respectively, by means of hydraulic cylinders 12, 13. To connect the vehicle 1 with the hook-up unit 8, a centering device 14 and a locking mechanism 15 are provided.

Figure 2:
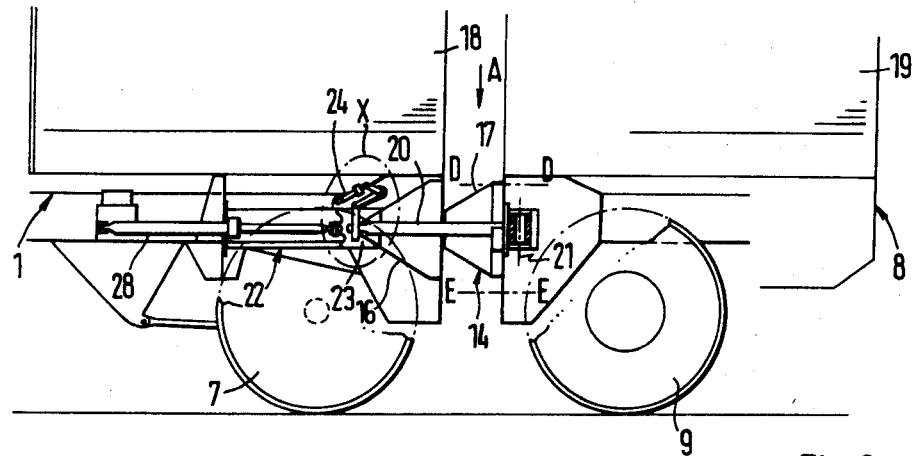
FIG. 2 is a partial view of FIG. 1 on an enlarged scale.
Figure 3:
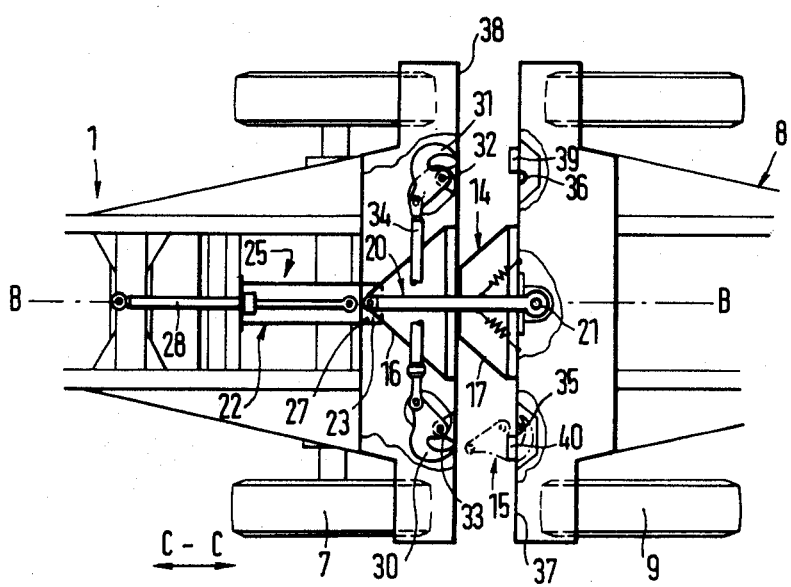
FIG. 3 is a view in the direction of arrow A in FIG. 2.
Figure 4:
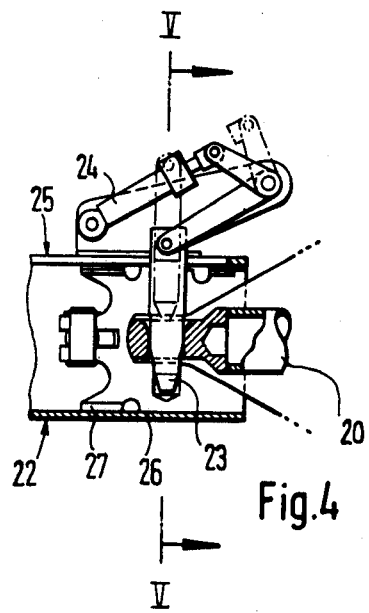
FIG. 4 is a detail X of FIG. 2 on an enlarged scale.

The centering device 14 is constituted by two centering members 16, 17 having the form of a truncated pyramid. These members are nestled one inside the other (when vehicle 1 and unit 8 are connected) and are arranged, on the one hand, at the vehicle 1 and, on the other hand, at the hook-up unit 8, in a longitudinal plane of symmetry B—B (FIG. 3) thereof. Installations 18, 19 for fire fighting or for rescue operations are indicated in FIG. 2 at the vehicle 1 and at the hook-up unit 8.

A towing arrangement 20 extends within the mounting members 16, 17 and is articulated to the hook-up unit 8 by way of a vertical axle 21. Additionally, the towing arrangement 20 extends from unit 8 in the manner of a towing fork, and cooperates with a tightening fixture 22 that is movable in the longitudinal direction C—C (FIG. 3) of the vehicle. For this purpose, the tightening fixture 22 is connected to a coupling 23 and the coupling 23 is actuated by means of a hydraulic cylinder 24. The coupling 23 can be optionally engaged by a push of the towing means 20 by way of a spring-loaded system and can be disengaged by means of the hydraulic cylinder.

The tightening fixture 22 comprises a guide element 25 constituted by a pipe 26 in the illustrated embodiment. The pipe serves for receiving a sliding element 27 connected to the coupling 23.

Figure 5:
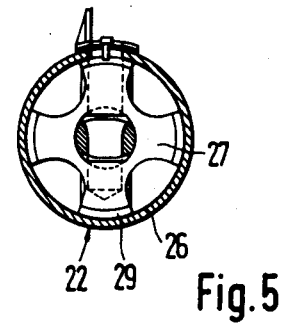
FIG. 5 is a section along line V—V of FIG. 4.

The sliding element 27 is operated by means of a hydraulic cylinder 28 and has the shape of a crosshead (FIG. 5). The inside of the pipe 26 and the surfaces 29 of the crosshead cooperating therewith can be coated—synthetic resin—so that a satisfactory operation of the sliding element 27 within the pipe 26 is ensured.

The vehicle 1 and unit 8 are securable together by a locking mechanism 13. The locking mechanism 15 comprises connecting hooks 30, 31, arranged toward the sides of the vehicle outside of the longitudinal plane of symmetry B—B and pivotable about vertically extending pins or studs 32, 33. The actuate the locking mechanism 15, a hydraulic cylinder 34 is provided.

The connecting hooks 30, 31 extend behind mounting members 35, 36 of the hook-up unit 8 which are arranged on a wall 37 of the unit 8. In addition to the aforedescribed connecting hooks 30, 31, additional such elements can be provided; for example, connecting hooks 30, 31 can be arranged at level D—D and additional connecting hooks can be arranged at level E—E (FIG. 2).

When the vehicle 1 is joined to the hook-up unit 8, the wall 37 of the unit 8 adjoins flushly against a wall 38 of the vehicle 1.

The manner in which the connection of vehicle 1 to hook-up unit 8 is achieved will be explained below.

The hook-up unit 8 is maintained in a basic position by means of supports 10, 11. The towing means 20 is under the action of a spring element (not shown in detail beyond the schematic representation in FIG. 3) holding the fixture in a central position.

The vehicle 1 is driven backwards toward the hook-up unit 8, until the towing means 20 abuts the coupling 23 and closes same preferably automatically.

At this point in time, the supports 10, 11 are pivoted upwardly, and the hook-up unit 8 is pulled via the tightening fixture 22 toward vehicle 1. More particularly, the hydraulic cylinder 28 connected to the sliding element 27 is contracted pulling the sliding element 27 (leftward as viewed in the drawings) along with the towing means joined thereto by coupling 23.

Figure 6:
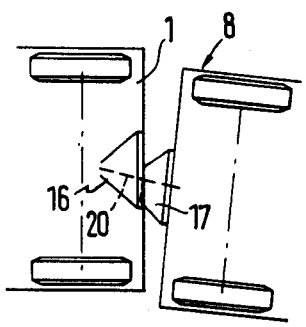
FIGS. 6 and 7 are schematic representations of coupling processes of the vehicle to the hook-up unit.

During this process, positional differences of the two vehicles (corresponding to FIG. 6) are compensated for by the members 16, 17 of the centering device 14. Even if there are differences in terrain, at right angles to the roadway, between vehicle 1 and hook-up unit 8, these differences are equalized by the centering device. The final centering is effected by means of bolts 39, 40 of the hook-up unit 8, which bolts engage in corresponding pockets at the vehicle 1.

Figure 7:
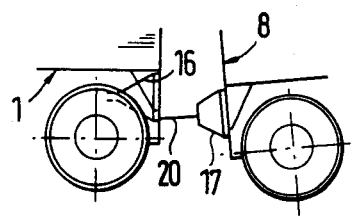

If the vehicle 1 is to be connected to the hook-up unit 8 in difficult terrain, such as illustrated in FIG. 7, for example, then the towing means 20 is connected to the coupling 23 of the tightening fixture 22. The vehicle 1 then pulls the hook-up unit 8 in the manner of a single-axle trailer into more favorable terrain, where then at last the final coupling process is executed.

While we have shown and described one embodiment in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A vehicle of the type having a motor driven vehicle unit and a wheeled auxiliary hook-up unit coupled thereto, comprising:
   (a) towing coupling means pivotally connected at a first end to said auxiliary unit for enabling towing of said auxiliary unit.
   (b) hook-up coupling means for securing a second, opposite, end of said towing coupling means to said vehicle unit and forming a pivotal interconnection therebetween.
   (c) tightening fixture means mounted to said vehicle unit for displacing the towing coupling means, when it is secured to said hook-up coupling means, between a first position wherein said hook-up unit is towable behind said vehicle unit in an articulated manner and a second position wherein said hook-up unit is drawn adjacent said vehicle unit and is towable rigidly coupled to said vehicle unit.
   (d) centering means for centering said vehicle unit relative to said auxiliary hook-up unit and including a centering member mounted in association with each of said units in surrounding relationship to said towing coupling means, said centering means being operable to guide said towing coupling means into a position within said tightening fixture means wherein it is securable to said hook-up coupling means, and
   (e) locking means for fixedly securing said auxiliary unit to said vehicle unit, when said hook-up unit is drawn adjacent said vehicle.

2. Vehicle according to claim 1, wherein each centering member has a truncated pyramidal shape.

3. Vehicle according to claim 1, wherein said locking means comprises connecting hooks mounted to one of said units which cooperate with mounting members on the other of said units.

4. Vehicle according to claim 3, wherein the connecting hooks are mounted to be movable about vertically extending pegs arranged on opposite sides of a longitudinal plane of symmetry of the vehicle unit.

5. Vehicle according to claim 4, wherein the connecting hooks are attached to the vehicle unit and the mounting members are attached to the auxiliary hook-up unit.

6. Vehicle according to claim 1, comprising spring means connected to the towing coupling means for applying a force thereto which acts to hold said coupling means relative to said auxiliary hook-up unit.

7. Vehicle according to claim 1, comprising a guide element, forming a further part of said tightening fixture means, said hook-up coupling means being guided by said guide element.

8. Vehicle according to claim 7, wherein the guide element is in the form of a pipe and said hook-up coupling means comprises a sliding element that is slideably received within said guide element.

9. Vehicle according to claim 8, wherein the sliding element has the shape of a crosshead.

10. A vehicle according to claim 3, comprising hydraulic cylinder means for actuating the connecting hooks, the tightening fixture means, and the hook-up coupling means.

11. Vehicle according to claim 1, wherein said auxiliary hook-up unit is provided with a retractable and extendable stand.

12. Vehicle according to claim 1, wherein said tightening fixture means comprises a hydraulic piston-cylinder unit coupled to said hook-up coupling means and guide means for guiding movement of said hook-up coupling means during said displacing of said towing coupling means.

13. Vehicle according to claim 1, wherein said hook-up unit has a van-type body.

14. Vehicle according to claim 1 or 13, wherein said vehicle is of the type equipped with installations for fire fighting or rescue operations.

* * * * *